Sept. 8, 1925.
F. LJUNGSTRÖM
TOOTHED GEARING
Filed May 8, 1920
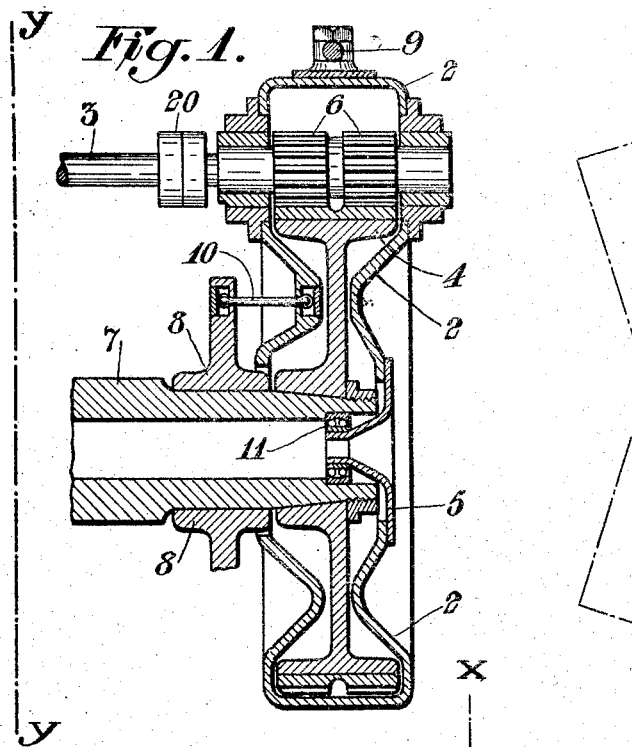
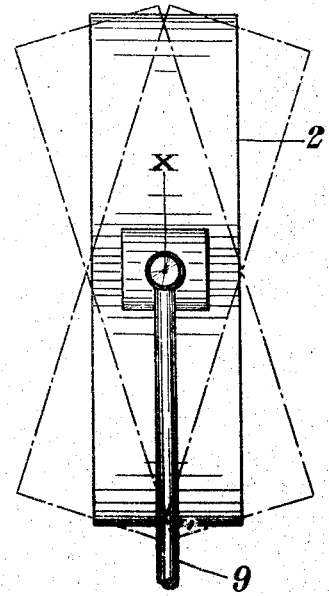
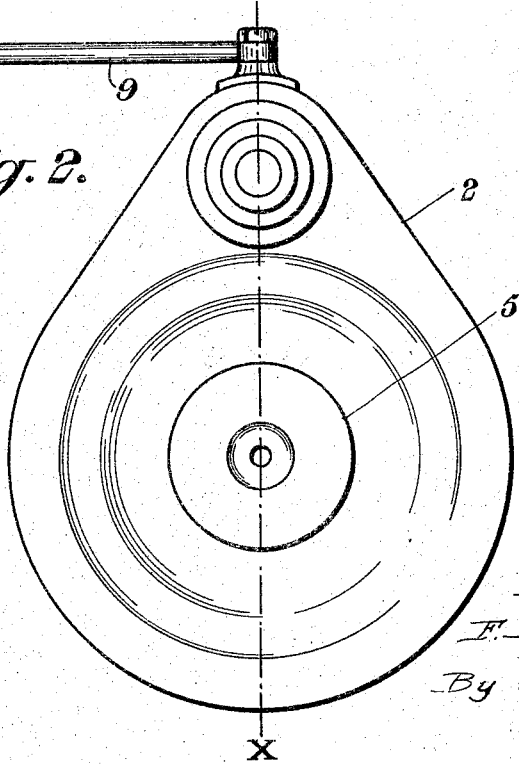
Inventor
F. Ljungström
By H. R. Kerslake
Attorney Patented Sept. 8, 1925.

1,552,859

UNITED STATES PATENT OFFICE.

FREDRIK LJUNGSTRÖM, OF BREVIK, LIDINGON, SWEDEN, ASSIGNOR TO AKTIEBOLAGET LJUNGSTROM ANGTURBIN, OF STOCKHOLM, SWEDEN, A CORPORATION.

TOOTHED GEARING.

Application filed May 8, 1920. Serial No. 379,898.

*To all whom it may concern:*

Be it known that I, FREDRIK LJUNGSTRÖM, subject of the King of Sweden, residing at Brevik, Lidingon, Sweden, have invented certain new and useful Improvements in Toothed Gearings, of which the following is a specification.

The present invention relates to toothed reduction gearings of the type which is particularly adapted for transmission of power from turbines or other motors running at high speeds to machines or machine parts which are to be driven at a lower rate of speed, such as propellers, locomotive wheels, etc.

The object of the invention is to automatically equalize the tooth pressures in the teeth of the various gear wheels.

Endeavours have been previously made to reach this object by making one gear wheel or group of gear wheels movable relatively to the other gear wheel or group of gear wheels, but this mobility could be obtained only at the cost of other disadvantages imposed on the construction.

These inconveniences are avoided according to the present invention by the shaft of the one gear wheel or group of gear wheels being journaled in a casing or the like which is movable spherically with respect to the other gear wheel or group of gear wheels around a point on the shaft of such gear wheel or group of gear wheels.

In the accompanying drawing, an embodiment of the invention is shown by way of example. Fig. 1 is a longitudinal section and Fig. 2 a side elevation. Fig. 3 is a diagrammatic top plan view of a detail.

In Fig. 1, 3 denotes a shaft adapted to be coupled to the motor running at a higher rate of speed, while 4 and 6 are the gear wheels (or groups of gear wheels) by means of which power is being transmitted to the shaft 7 carrying the gear wheel (or group of gear wheels) 4. The said shaft is journaled in the bearing 8 and connected directly or through the medium of a further toothed gearing or the like with a machine or machine part running at a lower rate of speed, for instance a propeller, a locomotive axle or the like.

According to the invention the shaft 3 is movable around the center of the wheel 4, which is attained in the embodiment disclosed by the shaft 3 being mounted in a casing 2 supported by a center piece 5 at which the casing is journaled inside the rotating shaft 7 by means of a spherical bearing 11 (an SKF bearing or the like). Neglecting shaft 3, the casing is movable in all directions. In order to prevent gears 6 from wandering on the toothed wheel 4, bringing the casing along with them, the casing is stayed by means of a member 9 (Fig. 2) the direction of which is preferably perpendicular to a plane through the center lines of the shafts (the plane of the paper in Fig. 1). To prevent the casing from moving in parallel with this plane, the casing is stayed by means of a member 10 situated in the said plane. Consequently, the casing will be stayed so as to be capable of moving in one plane only which is perpendicular to the plane through the center lines of the shafts, that is to say, the casing can move only in that plane which is necessary for obtaining an even tooth pressure in the gearing. As will be seen from Figs. 2 and 3, those places at which the stays are attached to the casing must be situated on, or approximately on the center line X—X, the casing in automatically adjusting itself while in operation having to turn around the said line.

In the case of a motor working together with a condenser, said motor being mounted on the shaft 3, the stay 9 is preferably attached to the condenser and maintained at such a temperature that the temperature changes thereof concur with the changes in temperature of the steam conduit connecting the steam motor with the condenser in such manner that the changes in volume and length occurring on variations in the temperature are equalized by similar changes in the stay 9 so that the stresses which would otherwise occur are prevented.

As the group of gear wheels 6 has to be movable in the plane above mentioned, the shaft 3 must be divided in two or more parts in such manner that the said and other desirable movements of the group of gear wheels shall not be prevented. This is effected by a suitable coupling, for instance a diaphragm-coupling 20 dividing the shaft so that the motor and the gear wheels are rendered somewhat movable relatively to each other. These couplings may also be arranged in the point of flexure of the shaft or on either side of the group of gear wheels.

In the embodiment shown in the drawing, the gear wheels are provided with straight teeth, but evidently the teeth may also be spirally cut, if desired.

Besides being sensitive and automatically adjustable to a uniform tooth pressure, the construction as set forth hereinabove has also the advantage of being independent of flexures in the shaft 7. Assuming a bend to occur in the shaft 7, the whole gearing will take a position corresponding thereto, the movable part being journaled on the said shaft. Thus, a bend in the shaft has no influence on the engagement of the teeth of the gears.

The gearing shown in the drawing may also constitute one (the right) part of a gearing which is symmetrical around the line $y$—$y$, the motor on the shaft being then placed between the gears 6 and between two diaphragm-couplings 20.

What I claim as new and desire to secure by Letters Patent of the United States is:—

1. In a toothed gearing, a gear wheel, a shaft supporting said gear wheel, a second gear wheel in mesh with the first mentioned gear wheel, a hollow shaft supporting the last mentioned gear wheel, a casing surrounding the gear wheels and supporting the first mentioned shaft, said casing being movable about a point on the hollow shaft and journaled within the same.

2. In a toothed gearing, a gear wheel, a shaft supporting said wheel, a second gear wheel in mesh with the first mentioned gear wheel, a hollow shaft supporting the last mentioned gear wheel, a casing surrounding the gear wheels and supporting the first mentioned shaft, said casing being movable about a point on the hollow shaft and journaled within the same, and means staying the casing in different directions.

3. In a toothed gearing, a gear wheel, a sectional shaft supporting said gear wheel, a flexible coupling connecting the sections of said shaft, a second gear wheel in mesh with the first mentioned gear wheel, a hollow shaft supporting the last mentioned gear wheel, and a casing surrounding the gear wheels and supporting the sectional shaft, said casing being movable about a point of the hollow shaft and journaled in the same.

4. In a toothed gearing, a gear wheel, a sectional shaft supporting said gear wheel, a movable coupling connecting the sections of said shaft, a second gear wheel in mesh with the first mentioned gear wheel, a hollow shaft supporting the last mentioned gear wheel, a casing surrounding the gear wheels and supporting the divided shaft. the casing being movable about a point of the hollow shaft and journaled in the same, and means staying the casing in various directions.

5. In a toothed gearing, a spur gear wheel, a shaft supporting said wheel, a second spur gear wheel in mesh with the first mentioned wheel, a shaft on which the last mentioned wheel is rigidly mounted, a casing surrounding the gear wheels and supporting the first mentioned shaft, said casing being universally mounted on the second mentioned shaft and supported by the same.

In testimony whereof I affix my signature.

FREDRIK LJUNGSTRÖM.